(12) United States Patent
Walter et al.

(10) Patent No.: US 6,209,479 B1
(45) Date of Patent: Apr. 3, 2001

(54) APPARATUS FOR COATING TABLETS

(75) Inventors: Kim Torben Walter; Mark Arthur Neidlinger, both of Columbia, MD (US)

(73) Assignee: Aeromatic-Fielder AG, Bubendorf (CH)

( * ) Notice: Subject to any disclaimer, the term of this patent is extended or adjusted under 35 U.S.C. 154(b) by 0 days.

(21) Appl. No.: 09/223,311

(22) Filed: Dec. 30, 1998

(51) Int. Cl.[7] ........................................................ B05C 5/02
(52) U.S. Cl. ................................. 118/20; 118/24; 118/62; 118/303; 118/DIG. 5
(58) Field of Search ........................... 118/DIG. 5, 62, 118/20, 24, 303; 239/424.5, 405

(56) References Cited

U.S. PATENT DOCUMENTS

| | | |
|---|---|---|
| 2,648,609 | 8/1953 | Wurster . |
| 3,241,520 | 3/1966 | Wurster . |
| 3,253,944 | 5/1966 | Wurster . |
| 3,632,257 * | 1/1972 | Ashizawa ............................. 118/462 |
| 3,822,140 * | 7/1974 | Gyarmati et al. ............... 118/DIG. 5 |
| 4,080,927 * | 3/1978 | Brown ................................... 118/48 |
| 4,221,182 * | 9/1980 | Brown ............................. 118/DIG. 5 |
| 4,749,595 | 6/1988 | Honda et al. . |
| 5,145,650 | 9/1992 | Huttlin . |
| 5,718,764 * | 2/1998 | Walter ................................. 118/303 |

FOREIGN PATENT DOCUMENTS

| | | | |
|---|---|---|---|
| 1646591 * | 5/1991 | (SU) | ....................................... 118/62 |
| WO 95/20432 | 8/1995 | (WO) . | |

* cited by examiner

Primary Examiner—Laura Edwards
(74) Attorney, Agent, or Firm—Sughrue, Mion, Zinn, Macpeak & Seas, PLLC

(57) ABSTRACT

A non-fluidized bed apparatus for coating tablets has a base plate of which a portion of the upper surface is inclined towards an upward directed two-fluid or three-fluid nozzle. Ducts through the base plate around the nozzle produce jets of process gas in a direction intersecting an imaginary centre line of the spray produced by the nozzle. Atomizing gas from the nozzle is muffled shortly after it has left the nozzle to decrease the upward scattering effect of said gas on the tablets being coated. No partition is used for separating upward and downward flow of tablets during the coating process. In the coating process the amount of atomizing gas supplied to the nozzle is limited to reduce the tablet scattering effect of said gas.

9 Claims, 4 Drawing Sheets

APPARATUS FOR COATING TABLETS

FIELD OF THE INVENTION

The present invention relates to coating of tablets. Herein the term "tablets" is used in a broad sense, comprising within the pharmaceutical industry not only proper tablets but also pills and capsules, and in the fertilizer and agrochemical industry pellets and granules.

Thus, the invention is not limited to any specific industrial area but is applicable in connection with the coating of any type of bodies having mean particle sizes in the range from approximately 2 mm to 50 mm, especially from 3 to 25 mm.

Coating operations are also important in several other industrial areas than the above-mentioned, such as in the detergent industry and in the confectionary and food industry as well as in the manufacture of catalysts.

Coating may be applied for several purposes, e.g. to obtain a desired colour or other visual improvements, to obtain a sustained or otherwise controlled release of active ingredients, to protect the tablets against humidity and oxygen from the environment, to increase resistance against abrasion and to prevent dust formation in the handling of the tablets.

BACKGROUND OF THE INVENTION

Most tablet coating is still done using the same method as in the last 50 years, i.e. coating in the pan coater, in spite of the fact that this apparatus has serious drawbacks.

These drawbacks are due to the fact that in the pan only one side of the tablets' surfaces is exposed to a spray of coating liquid at a time. This apparatus also has the drawback that the inlet temperature of the drying gas has to be lower than the maximally permitted product temperature. This makes the evaporation capacity of the process gas low necessitating a low spray rate and resulting in a long process time. Furthermore, it is necessary to apply a very moderate spray rate to prevent the tablets from sticking together by the coating which fact also decreases the handling capacity.

Because of these drawbacks associated with the pan coater several processes have been suggested for coating particulate materials or small bodies, such as granulae, pellets or crystals.

The first improvement was the use of a fluidized bed for suspending the product. The coating solution was applied to the product as spraying from the top counter-current to the air flow. In comparison to the pan coater, the drying capacity was increased due to the drying capability of the fluidizing air. However, the inlet temperature of the drying/fluidizing air was limited by the maximally acceptable product temperature.

To improve the efficiency of coating it is suggested in U.S. Pat. No. 2,648,609 (Wurster) to impart a turbulent flow of the drying and suspending air by conducting it through ducts in a rotating disc before introduction below a screen over which pass the tablets being coated. The purpose of using a turbulent air flow was to obtain a tumbling action on the tablets to make the coating thereon more even. By this process the coating liquid was applied cocurrently to the air flow, enabling higher inlet temperatures of the drying air, but the treatment was rather severe to the tablets due to contact between the tablets during their tumbling movement. Besides, said tumbling created by the turbulent flow of drying air was insufficient to ensure an even distribution of the coating spray on all surfaces of each particle.

Moreover, processes involving a proper fluidisation of the articles to be coated are less suitable for tablets of the size usual inter alia in the pharmaceutical industry because, given their size and shape, these cannot easily be fluidized. Therefore, the fluidized bed was modified into a so-called spouting bed. In this design, the perforations in the bottom of the bed for the process air are concentrated in one or more locations so that the process air at those points has enough velocity to transport the tablets pneumatically. The spray nozzle is placed in the bottom of the fluid bed at the same place as the perforations. The coating solution is then applied in the same direction as the movement of the tablets, i.e. co-currently. With the process air entering where the spray nozzle(s) are placed and thus having the product, spray droplets and drying air all moving in the same direction, the heat and mass transfer are efficient. This change in design also permitted the inlet temperature to be higher than the maximum acceptable product temperature because the evaporation heat cooled the product. Although this design was more efficient than the previous designs, it had a rather limited equipment capacity. The product layer thickness was limited because the process air had to keep the tablets spouting. Also there had to be a minimal distance between the nozzles to avoid interference. An apparatus of this design is described in U.S. Pat. No. 4,749,595 (Honda et al.).

Also U.S. Pat. No. 5,145,650 (Hüttlin) discloses a fluidized bed apparatus having a plurality of nozzles. Although the area of applicability is indicated as including tablet coating, the apparatus seems most suitable for processing and agglomerating smaller particles. Delicate and friable tablets would be damaged by this long lasting stay in the fluidized bed.

U.S. Pat. No. 3,253,944 (Wurster) discloses a process in which the particles to be coated are subjected to a cyclic flow. Instead of the randomness of particle motion characteristic of fluidized beds, a portion of the particles flow upwards, while being sprayed, and the rest of the particles flow downwards. The flow is created by introducing drying and flowing air at different intensity through various parts of the bottom of the drying chamber, for instance by having holes or other perforations distributed in a certain pattern in said bottom. However, it has turned out that the upward flow of particles being sprayed and the downward flow of particles being dried are not easily kept separate and mutual contact between said two particle flows substantially disturbes the process.

A further improvement in coating technology was therefore obtained by introducing a tube or partition located around the perforations where the process air enters and where the spray nozzle is located. Examples of such equipment are described in U.S. Pat. No. 3,241,520 (Wurster et al.). The tube acting as partition solved 2 major problems of the spouting bed: The product layer could be increased because the tube allowed free passage of the coated product and it solved the problem of interference when more spray nozzles were present in the same housing. This equipment turned out to be very suitable for coating relatively small objects, but it was not suitable for coating tablets. This is due to the fact that the free-fall velocity of a tablet is comparatively high, and the process air velocity has to be above this free-fall velocity to transport the tablets pneumatically. However, this high velocity is such that it often damages the tablets, depending on the strength of these.

Another drawback of this equipment is the formation of agglomerates when using sticky coating solutions. Also formation of deposits of coating material on the surfaces of the tube is a common problem, and the utilization of the drying capacity of the process air is inadequate. Also serious upscaling problems are inherent in this design.

The agglomeration problem was essentially solved by a new apparatus described in WO 95/20432 (Aeromatic-Fielder AG) in which the process air was imparted a swirling motion already before reaching the bottom plate of the apparatus, and the process air was introduced just around the upward directed nozzle. Although this apparatus involved substantial improvements and was capable of producing more uniform high-quality coatings than other apparatuses it was less suitable for large tablets than for minor objects.

This is partly due to the fact that the object to be coated has to be in a spinning movement when hit by the spray of atomized coating liquid droplets.

In the apparatus described in the above-mentioned WO 95/20432, the particles to be coated are imparted a suitable spin by the shear flow in the process air. However, this method is not suitable for objects of the size of pharmaceutical tablets.

Therefore, there is a need for a new process and a new apparatus capable of creating the desired fast spin of the object to be coated, also when this object is a relatively large tablet.

Furthermore, the development of tablet pressing machines and other manufacturing equipment has involved a substantial increase of the production capacity thereof and, consequently, there is a need for an increase of also the capacity of coating processes and apparatuses.

Besides, especially in the pharmaceutical industry, there is an increasing need for processes producing a very precise coating. That means that all tablets in a batch, or in a lot being treated continuously, must receive substantially the same predetermined amount of coating material, and, this must form a film or layer of even thickness on all surfaces of each tablet. This is important when a purpose of the coating is to obtain a precise sustained release of drug from the tablet having received the coating or when the coating in itself comprises an active ingredient.

Also for the production of multi-layered coating there is a need of a precise coating as defined above.

It has turned out that the presence of partitions, such as the tubes used in the embodiments of the above-mentioned U.S. Pat. No. 3,241,520 and WO 95/20432, for tablet coating not only involves problems due to the abrasion of the tablets thereon and the formation of sticky deposits, but also because the construction, using partitions outside which a thick layer of objects to be coated is resting, demands a long residence time for the product resulting in a low production capacity and a long lasting mechanical stress on the tablet.

SUMMARY OF THE INVENTION

The present invention is based on the recognition that it is possible to avoid the above explained drawbacks of the prior art technology and fulfil the specified needs in tablet coating by using special pneumatical means for guiding and controlling the movement of the tablets to be coated and thereby omitting the partitions used in the prior art, and by controlling and guiding the spray of coating liquid by means not hitherto applied in the art.

Said special pneumatical means comprises a gas flow introduced with the purpose of influencing the flow path of the atomizing air after the latter as exerted its atomizing action, to decrease the upward lifting effect thereof. Said influencing is herein and in the attached claims termed "muffling".

Thus, the invention deals with a non-fluidized bed apparatus for coating tablets, having within a housing at least one coating station comprising a perforated base plate, an upward directed two-fluid nozzle centrally in the base plate, means for providing coating liquid to said nozzle, means for providing atomizing gas to the nozzle and means for providing an upward gas stream through the perforations through the base plate.

The apparatus is characterized in that the upper surface of the base plate is inclined towards the nozzle; the perforations through the base plate are ducts arranged around the nozzle, and the upward imaginary prolongations of said ducts intersect an imaginary centre line of the spray to be produced by said nozzle; the apparatus further having means for pneumatically muffling the atomizing gas shortly after the latter has left the nozzle to decrease the upward scattering effect of said gas on the tablets being coated; and the area above the base plate influenced by the spray and the gas flow from said nozzle, from the muffling means and from the perforations is without partition for the tablets to be coated.

The means for pneumatically muffling of the atomizing gas currently regarded as most suitable for the purpose and with which most practical experience has been obtained, comprises outlets for gas supply means encircling the two-fluid nozzle, and providing a rotating upward gas flow which meets the upward spreading atomizing gas stream from the two-fluid nozzle and deflects and modifies said stream turning it into a broader swirling flow having reduced upward scattering effect on the tablets being coated.

Very satisfactory results have been obtained when said outlets for gas supply means debouch in an annular cavity encircling the nozzle. By this embodiment the upward swirling flow of muffle gas is forced to merge with the atomizing gas.

However, muffling of the atomizing gas may also be achieved by other means. Although three-fluid nozzles have hitherto been constructed with a view of obtaining a desired gas atmosphere in the atomization zone, it might be possible to modify a three-fluid nozzle in such a way that the gas flow in the outer zone at the nozzle tip obtains a direction partially tangential to the atomizing gas. Thus, the invention also comprises embodiments wherein the means for pneumatically muffling the atomizing gas comprises a mantel surrounding the two-fluid nozzle. That means that in fact a three-fluid nozzle is used. Therefore, the term "two-fluid nozzle" is used herein and in the attached claims as covering not only a two-fluid nozzle proper, but also the central portions of a three-fluid nozzle, viz. the portions delivering the spray liquid and the atomizing gas.

In contrast thereto it is an advantage of the embodiment described above that the muffling and the process air introduced through the ducts are supplied from the same plenum and need no adjustment during the operation.

Further preferred embodiments of the apparatus according to the invention are subject of the claims 3–9 and are explained in connection with the description of the drawings below.

The invention also comprises a process for coating tablets by subjecting the tablets to an upward spray of coating liquid produced by a two-fluid nozzle, using an apparatus as described above, which process is characterized in that the tablets before meeting said spray are caused to spin by acentrally impact of gas jets directed upward to intersect an imaginary centre line of said spray, and simultaneously and subsequently the spinning tablets are by said gas jets guided towards a central position over the two-fluid nozzle to increase the number of suspended tablets contacting the spray; the two-fluid nozzle is provided with atomization gas which is adjusted to an amount less than the one which, after moderation by means of muffling gas, would scatter the tablets in the drying zone away from the spray of coating liquid droplets; and the upward tablets scattering effect of the atomizing gas is reduced by pneumatically muffling thereof just above the nozzle.

Preferred embodiments of the process are defined in the claims 10–16 and are further illustrated in connection with the below description of the drawings.

DETAILED DESCRIPTION OF THE DRAWINGS

Figure 1:
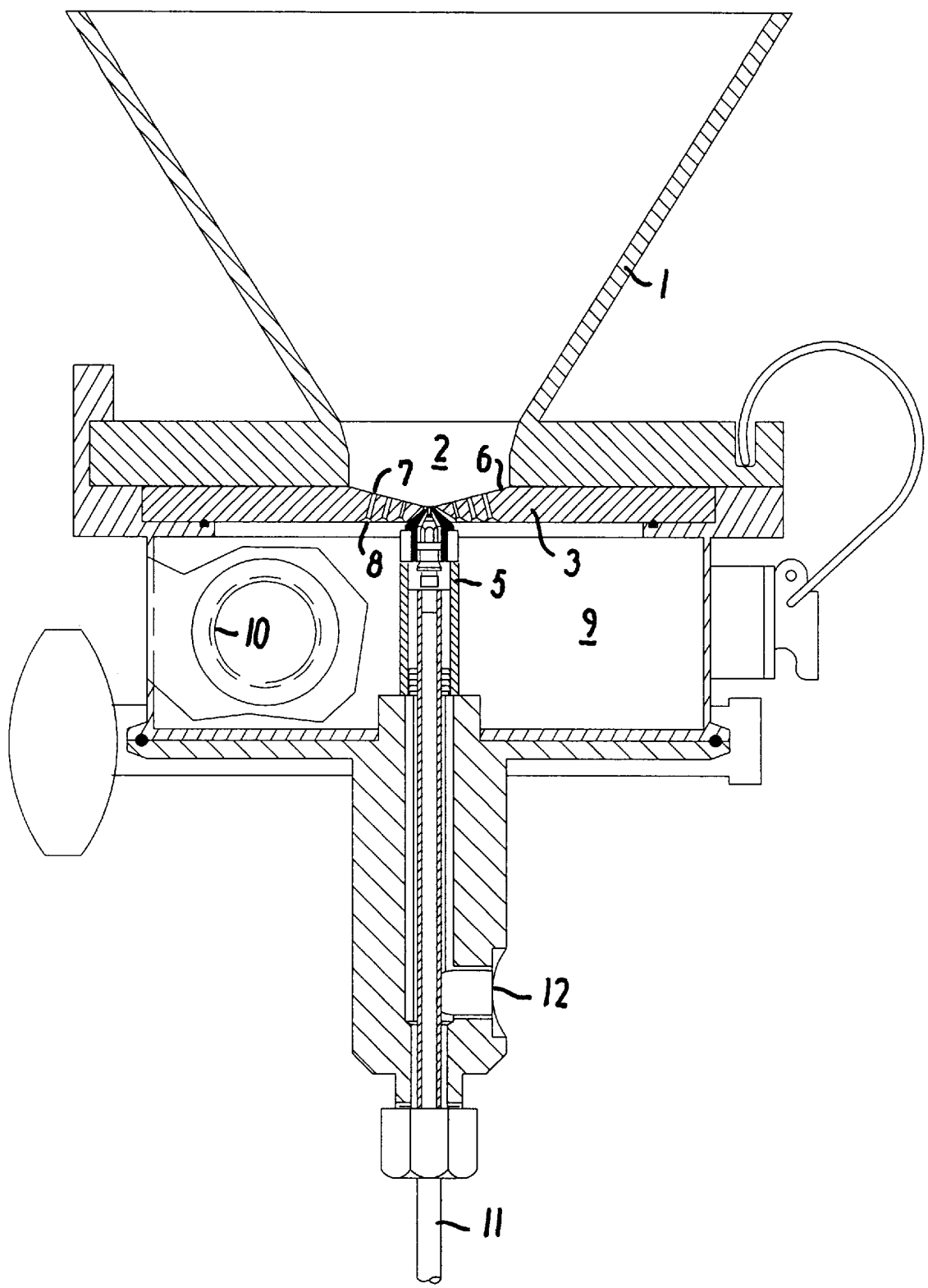
FIG. 1 is a vertical sectional-view of an embodiment of a coating apparatus according to the invention.

In the coating apparatus depicted in FIG. 1 a funnel-like member 1 circumvents a coating zone 2. As depicted the inner walls of the lower part of the member 1 are in this preferred embodiment only slightly conical or even vertical.

Under the zone 2 a base plate 3 is shown.

Figure 2:
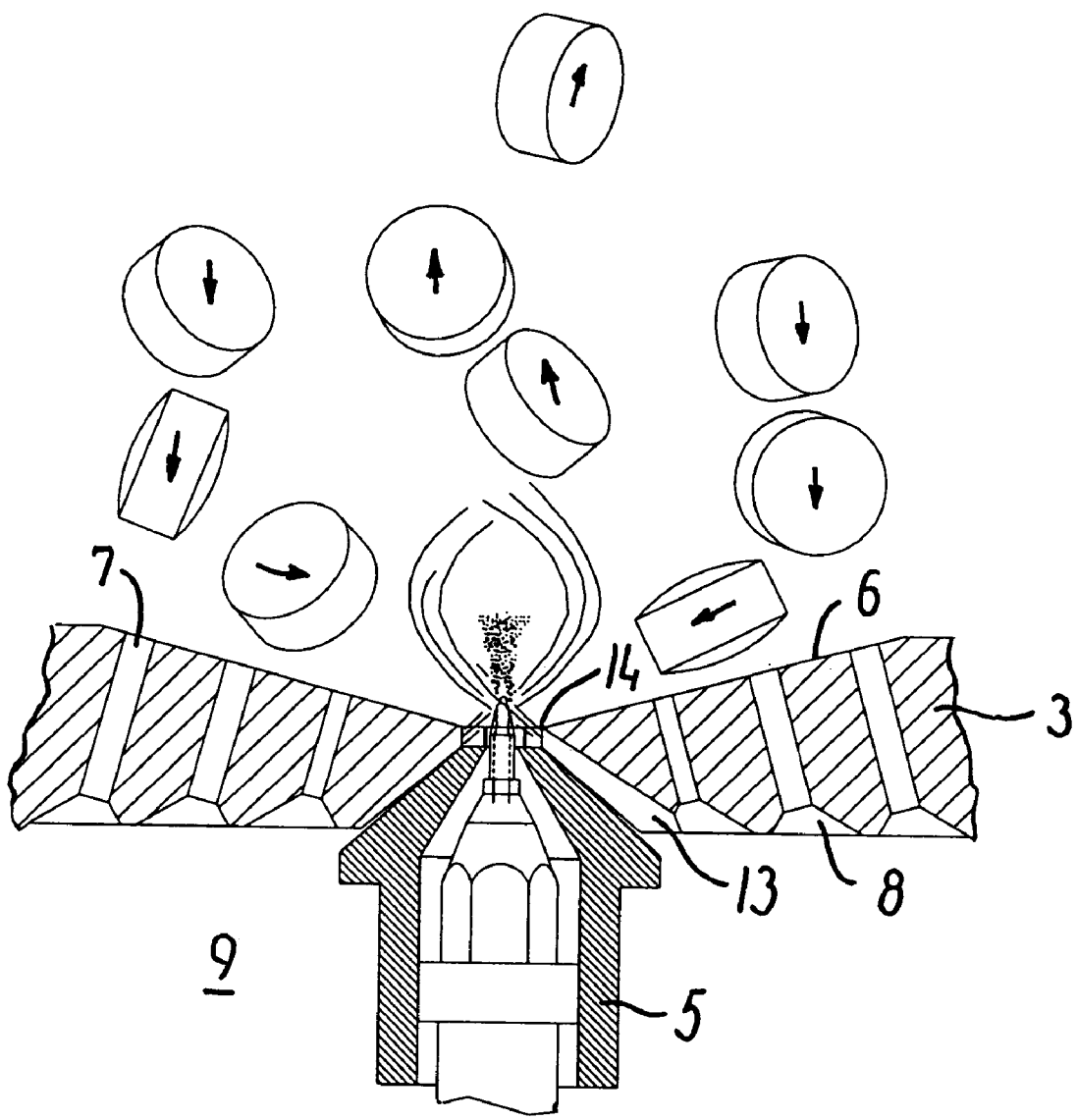
FIG. 2 is an enlarged vertical sectional-view of the central portion of an embodiment of the apparatus according to the invention similar to the embodiment shown in FIG. 1, also showing the flow of tablets being coated.
Figure 3:
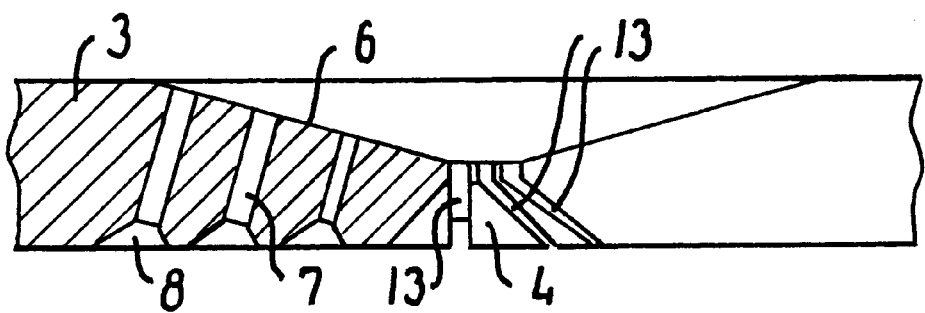
FIG. 3 is a vertical partial sectional-view of a base plate as used in the embodiments of the invention shown in FIGS. 1 and 2.
Figure 4:
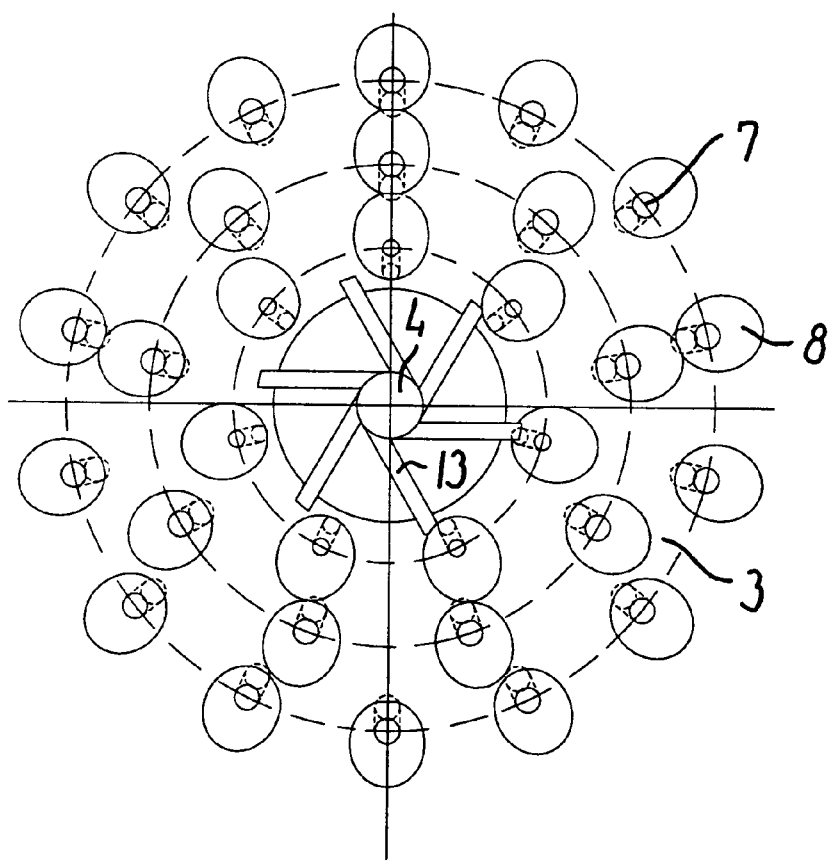
FIG. 4 schematically shows the base plate of FIG. 3 seen from below.

As it appears most clearly from the FIGS. 3 and 4, the base plate has a hole 4 for accomodating a two-fluid nozzle as indicated by the number 5 in FIGS. 1 and 2.

It is an important feature of the invention that at least the substantial part of that portion 6 of the upper surface of the base plate 3, which is encircled by the member 1, is inclined downwards against the tip of the nozzle 5 in the hole 4. The inclination of the surface 6 to the horizontal level is preferably 5–20°, more preferably 10–15°. The portion of the plate immediately adjacent to the upper part of the hole 4 may, together with the tip of the nozzle, protrude somewhat upwards (not shown) to avoid depositing of dust in that area.

Another important feature of the invention is the provision of ducts 7 through the base plate 3.

In the preferred embodiments depicted in the figures those ducts are perpendicular to the inclined surfaces 6. However, their direction may depart somewhat from the one perpendicular to the surface 6; they may for instance be less vertical than shown in the figures, in which case the inclination of the surface 6 may be somewhat smaller than if the ducts were perpendicular thereto.

Moreover, the ducts 7 are further arranged so that the upward imaginary prolongations intersect an imaginary centerline vertically over the hole 4. Which vertical line is also the imaginary centerline of the spray to be produced by the nozzle 5.

The diameter of the ducts will typically be 1–1½mm and their length not less than three times the diameter.

The ducts may have different diameters to produce jets of different intensity. Thus, the ducts near the nozzle 5 will typically be more narrow than those more distant from the nozzle.

The distance between the ducts 7 is selected depending on the size of the tablets to be coated to be from 0.2 to 1.5 times the largest dimension of the tablets.

The total area of the ducts 7 plus the area of the outlets 14, described below, typically amount to 3–6% of the horizontal area of the inclined surface 6, preferably approximately 4%.

At the lower surface of the base plate 3 the ducts 7 have funnel-like terminations 8 to obtain a desired flow pattern through the ducts 7.

Below the base plate 3 is a plenum 9 for providing drying air through the ducts 7 and muffling air for controlling the flow of atomizing air from the two-fluid nozzle, as explained in more details below.

Air is conducted to the plenum through a pipe 10.

The plenum may comprise more than one compartment (not shown), thereby enabling supply of air at various pressures to various groups of ducts 7 and/or means for introducing muffling gas (such as the grooves 13 described below).

The two-fluid nozzle 5 receives coating liquid through conduit 11 and atomizing air through pipe 12 (FIG. 1).

As best seen on the FIGS. 2, 3 and 4, the upward tapering conical walls of the hole 4 for accomodating the tip of the two-fluid nozzle 5 is provided with grooves 13 which, when the nozzle is in place, forms ducts leading from the plenum 9 to outlets 14 (FIG. 2) encircling the tip of the nozzle. The depicted embodiment of the apparatus has six such grooves (FIG. 4). The grooves debouche tangentially in relation to the nozzle, for which reason air conducted from the plenum through said grooves to the outlets 14 leaves as an upward swirling flow encircling the nozzle.

The operation of the apparatus is further described with reference to FIG. 2 which also shows the tablet flow during the coating process.

By the process according to the invention applying the described apparatus the tablets to be coated obtain a spinning movement of high-velocity before reaching the spray of coating liquid and, at the same time, it is avoided that the atomizing air from the two-fluid nozzle scatters the flow of tablets, for which reason a high concentration of tablets can be maintained in the spraying zone.

How this is obtained appears from FIG. 2 which shows that tablets are falling downwards in the periphery towards the base plate 3. Before touching said plate they obtain a radially inward movement due to the influence of an air flow sucked into the flow above the nozzle and also by the influence of gas jets provided from the plenum 9 through the ducts 7. However, the main effect of these gas jets is to create a fast spinning movement of the tablets before they reach the spray from the nozzle 5. The gas jets blown in through the ducts have a velocity of 80–180 m/sec., preferably 100–150 m/sec.

If no special measures were taken to reduce the scattering effect of the atomizing air from the two-fluid nozzle, the tablets would be blown up at a considerable height and, therefore, the tablets would be spread, which means that only a minor portion of the spray-coating liquid would be deposited on the tablets'surfaces. Besides, such vigorous flow may damage the particles and increase the abrasion thereof.

The process comprises two measures to avoid this. Firstly, the amount of atomizing air is reduced compared to the amount normally used for nozzles of the type in question. This means that the droplet size of the spray becomes larger than usual for two-fluid nozzles, but due to the sizes of the tablets this is of no importance as to the quality of the final coating.

Secondly, the flow of atomizing gas is stiffled by muffling gas introduced through the grooves 13 to the outlets 14. In the depicted embodiment, the muffling gas leaves the outlets 14 at substantially the same velocity as the one of the jets from the ducts 7 fed from the same plenum 9. However, when the plenum has more compartments it may be possible to adjust the amount of muffling gas and the amount of gas introduced through the ducts 7 independently. The muffling gas creates a swirling flow which rapidly influences the flow of atomizing air from the nozzle. Therefore, the last-mentioned flow also becomes swirling and, consequently, the upward velocity component and thus the tablet lifting capability becomes lower, whereas the size of the spray cloud becomes somewhat broader.

This means that the spinning particles passing along the inclining surface of the base plate 3 when reaching the spray only receive a moderately lifting influence and their residence time in the zone where they are hit by the spray droplets is relatively extended.

Instead of a muffled two- or three-fluid nozzle another low momentum spray device, e.g. electrostatic or ultrasonic spray means, also being low momentum spray devices, can be considered for use in the apparatus and the process.

The apparatus and the process according to the invention may be used both for batch-wise and continuous tablet-coating.

Apparatuses of both types may comprise one or several coating stations. When more than one coating station is applied, they may be operated either independently as a parallel system or they may be connected in series.

Figure 5:
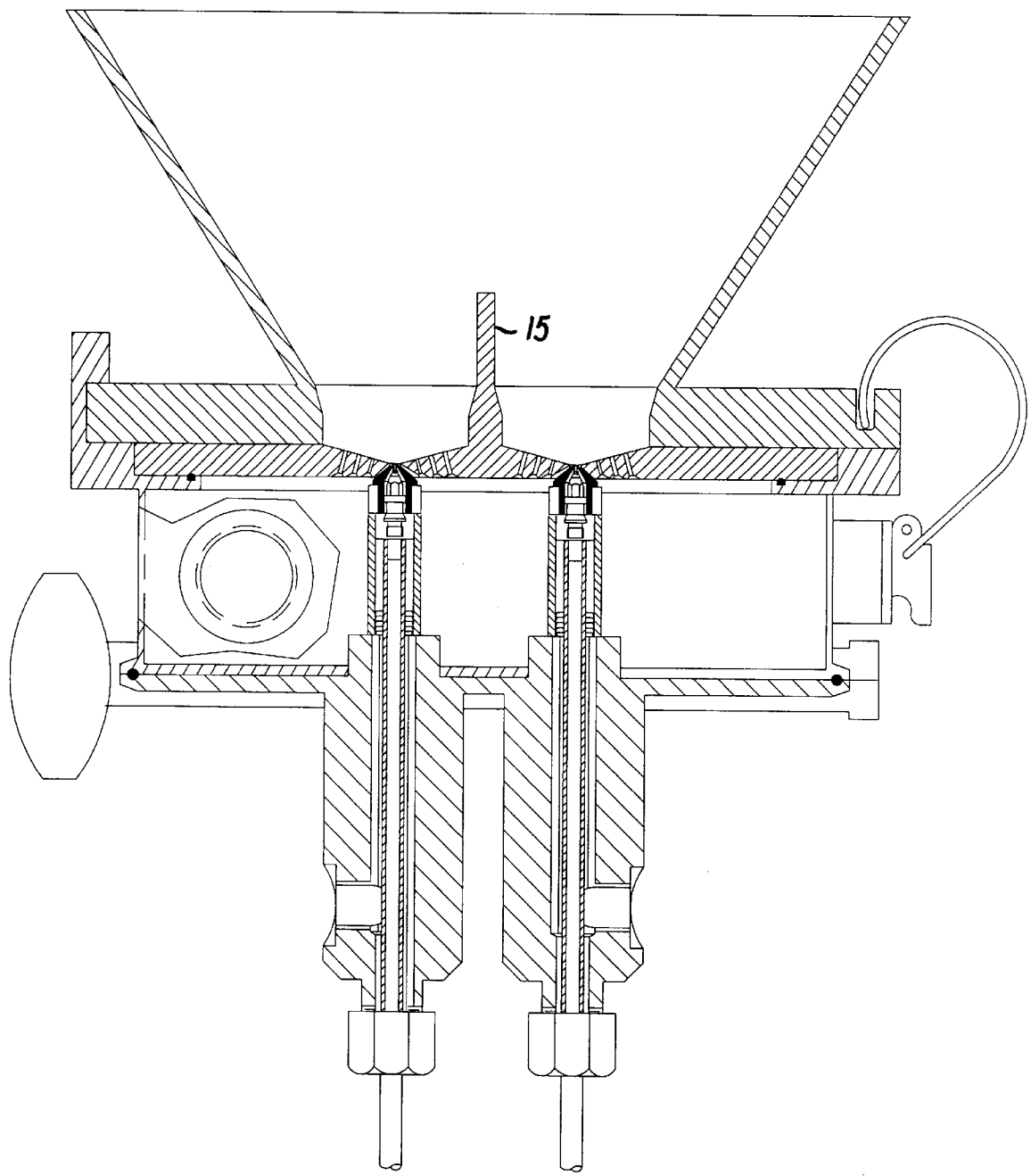
FIG. 5 is a schematically vertical sectional-view of an embodiment of the apparatus according to the invention having more than one treating station.

As depicted in FIG. 5 the coating stations may be separated by a wall 15 over which the tablets pass at random when lifted by the coating spray flow.

Passage of tablets from one coating station to another may also be obtained by a controlled permanent or adjustable tilting of the apparatus.

For continuous operation an apparatus according to the invention may typically comprise five coating stations connected in series. Passage from one station to the next is controlled by tilting the battery of stations. The coating capacity of such a multi-station apparatus will be approximately 3,000 tablets/min. when a coating layer of 20–30 $\mu$m shall be obtained using an aqueous coating solution. The total treatment time for each tablet for passing all five stations will be approximately 10 sec.

In such a battery of coating stations coating materials of different composition may be applied to obtain a multi-layer coating in only one passage of the tablets through the battery of coating stations.

In commercial use the apparatus according to the invention will of course be provided with equipment for automatic operation based on signals obtained by continuously or periodically monitoring of various parameters, such as flows or temperatures of gasses or tablets introduced or withdrawn from the apparatus or other parameters which will be obvious to a person skilled in the art.

The invention is further elucidated by the following example.

EXAMPLE

A coating operation was performed in an apparatus as the one shown in FIG. 1

The size of the apparatus was such that the horizontal diameter of the inclined surface 6 was 40 mm.

The tablets to be coated were circular and had the following dimensions:

diameter . . . . . . . . . . . . 7.0 mm
height . . . . . . . . . . . . . 4.5 mm
surface area . . . . . . . 6.6 ×10$^{-5}$ m$^2$ The weight of each tablet was 0.164 g and the number of tablets in the batch was 200 corresponding to a total weight of 32 g.

The coating liquid was a 20 weight% aqueous solution of Opadry® YS-1-7003, which is a coating based on hydroxypropyl methyl cellulose.

Ambient condition:
temperature . . . . . . . . . . . . . . . 19° C.
relative humidity . . . . . . . . . . . . . 64%
Inlet temperature of gas
introduced to the plenum . . . . . . . . 108° C.
Flow rate for process gas
introduced to plenum 9 . . . . . 0.00684 m$^3$/sec.
Velocity of process gas through
the ducts 7 and the outlets 14 . . . 128 m/sec.
Atomizing pressure . . . . . . . . . . . 2.5 bar
Atomizing gas flow rate . . . . 0.0004 Nm$^3$/sec.
Coating solution spray rate . . . . 8.25 g/min.
Process time . . . . . . . . . . . . . . 40 sec.
Coating thickness . . . . . . . . . . . 42 $\mu$m The resulting coated tablets were subjected to various examinations and tests. By these no damage of the tablets was observed and the coating was estimated as being of very even thickness and of high-quality.

Several other runs have been made with similar equipment and using the process of the invention, and the results obtained thereby indicate that the invention enables not only a faster coating of each tablet than possible when using any of the commercial coating apparatuses, but it has also turned out that the apparatus enables coating of tablets being too delicate or friable to be coated by known commercial processes or apparatuses.

What is claimed is:

1. An apparatus for coating tablets comprising:

a housing including at least one coating station which comprises:

a perforated base plate having an inclined upper surface;

an upward directed two-fluid nozzle located centrally in the base plate, said inclined upper surface being inclined toward the nozzle;

means for providing coating liquid to said nozzle to provide a spray from said nozzle;

means for providing gas to the nozzle to provide a flow of atomizing gas from said nozzle;

means for providing an upward gas stream through the perforations in the base plate; and muffling means for pneumatically muffling the atomizing gas shortly after the atomizing gas has left the nozzle to decrease upward scattering effect of said gas on the tablets being coated, wherein the perforations of the base plate are ducts arranged around the nozzle such that their respective longitudinal axes intersect at a center line of said nozzle and wherein an area above the base plate influenced by the spray and the atomizing gas flow from said nozzle, and by gas flow from the muffling means and from the ducts, is without partition.

2. An apparatus according to claim 1, wherein the means for pneumatically muffling the atomizing gas comprises outlets of gas supply means encircling the two-fluid nozzle and providing a rotating upward gas flow which meets the upward spreading atomizing gas stream from the two-fluid nozzle to decrease the upward velocity thereof and to deflect said upward gas flow into a broader swirling flow.

3. An apparatus according to claim 2, wherein said gas supply means are grooves in the base plate connected to a plenum which also supplies gas to said ducts in the base plate.

4. An apparatus according to claim 2, wherein said gas supply outlets debouch in an annular upward open cavity encircling the nozzle.

5. An apparatus according to claim 1, wherein the means for pneumatically muffling of the atomizing gas comprises a mantel surrounding the two-fluid nozzle thereby forming a three-fluid nozzle.

6. An apparatus according to claim 1, wherein the inclination of the base plate to the horizontal level is 5–20°, preferably 10–15°, and the ducts concentric around the nozzle are essentially perpendicular to the inclining upper surface of the base plate.

7. An apparatus according to claim 6, wherein the distances between the ducts are selected depending on the size of tablets to be coated to be from 0.2 to 1.5 times the largest dimension of the tablets.

8. An apparatus according to claim 1, wherein a vertical or a slightly upward broadening conical wall extends from the periphery of the inclined area of the upper surfaces of the base plate, which wall at distance from the base plate changes direction to form a more expanding conus.

9. An apparatus according to claim 1, wherein said housing includes a plurality of said coating stations mutually separated by partial separating walls placed on or close to the base plates, the height of which walls is less than the maximum height to which the tablets are lifted during the operation of the apparatus, thereby enabling controlled transfer of tablets from one station to another.

* * * * *